Sept. 24, 1957   J. J. OEZER   2,807,706
APPARATUS FOR AUTOMATIC CONTROL OF ELECTRICAL DISCHARGE MACHINE
Filed Oct. 25, 1954   3 Sheets-Sheet 1

INVENTOR.
JOHN J. OEZER
BY
H. K. Parsons & C. N. Wright.
ATTORNEYS.

Sept. 24, 1957  J. J. OEZER  2,807,706
APPARATUS FOR AUTOMATIC CONTROL OF ELECTRICAL DISCHARGE MACHINE
Filed Oct. 25, 1954  3 Sheets-Sheet 2

INVENTOR.
JOHN J. OEZER
BY
N. K. Parsons & C. W. Wright
ATTORNEYS.

Sept. 24, 1957   J. J. OEZER   2,807,706
APPARATUS FOR AUTOMATIC CONTROL OF ELECTRICAL DISCHARGE MACHINE
Filed Oct. 25, 1954   3 Sheets-Sheet 3

INVENTOR.
JOHN J. OEZER
BY
*H. K. Parsons & C. W. Wright.*
ATTORNEYS.

United States Patent Office 2,807,706
Patented Sept. 24, 1957

2,807,706

APPARATUS FOR AUTOMATIC CONTROL OF ELECTRICAL DISCHARGE MACHINE

John J. Oezer, Cincinnati, Ohio, assignor to The Cincinnati Milling Machine Co., Cincinnati, Ohio, a corporation of Ohio Application October 25, 1954, Serial No. 464,366

5 Claims. (Cl. 219—69)

This invention relates to a new and improved method and apparatus for automatically controlling an electrical-discharge apparatus for removal of metal by heating and disintegrating the same.

In the art of electrical-discharge machining, a tool in the form of an electrode, and a workpiece on which the machining operation is to be performed, are connected in circuit to a source of pulsating direct-current, so that when the electrode and the workpiece are brought into close proximity, such as a prescribed gap distance, a series of electrical discharges will be fired across the gap in such a manner that particles of metal will be separated and removed from the workpiece. Since heat is thus generated during this operation, it is somewhat the practice to carry out this operation in the presence of a dielectric coolant so that the particles of hot metal are boiled or washed away by the coolant, thus facilitating the machining operation.

It has been found in prior art machines that for a given gap distance, there is an optimum gap discharge voltage which will produce the most efficient metal removal rate, as well as the best accuracy and finish. It has also been found that variations in the gap distance has an effect on the gap wattage or electrical condition across the gap, and changes in this condition have been utilized to adjust and control the gap distance. It is, therefore, essential that the relative movement of the electrode with respect to the workpiece be controlled very accurately to obtain maximum efficiency in the machining operation.

Prior machines in this art have been deficient in that the control mechanism is unable to respond sufficiently fast to minute changes in the electrical condition across the gap to coordinate the rate of feed of the electrode with respect to the rate of metal removal. Such response deficiency results in lost motion in the electrode due to hunting, thereby increasing the time required for each machining operation and decreasing the efficiency of the machine.

Prior methods of control have also been unable to establish the initial prescribed gap spacing at the beginning of the operation when the electrode is rapidly traversed to cutting position without excessive hunting. Therefore, it has been the general practice to provide additional mechanism for gradual deceleration of the electrode or even resort to manul operation all of which increases the time for set-up and the time for starting the actual machining operation.

Also, during such operations, the metal particles removed will at times lodge in the clearance or gap between the electrode and workpiece and cause a short circuit. Such short circuits have an effect on the control mechanism to cause immediate retraction of the electrode until the short circuit is broken. Prior methods of control have been unable to quickly reestablish and stabilize the gap spacing after such an occurrence, thus causing substantial loss of time.

Accordingly, it is an object of the present invention to provide a new and improved method and apparatus for performing an electrical discharge machining operation.

Another object of the present invention is to provide a new and improved operating and control mechanism for automatically controlling the movement of the electrode relative to the work.

Still another object of the present invention is to provide an improved method and means to increase the response of the electrode controlling mechanism to minute changes in the electrical changes across the gap, and eliminate sluggishness in controlling and maintaining the desired gap spacing.

A further object of the present invention is to provide an improved control mechanism for a machine of the class described which is automatically responsive to metal particles being lodged and thus short-circuited between the electrode and workpiece and effect this removal with a minimum of disturbance to the machining cycle.

Still another object of the present invention is to provide a new and improved electro-hydraulic control for a machine of the class described including a low inertia driving mechanism, which is subject to quick change and reversal with a minimum of overrun.

An additional object of the present invention is to provide a new and novel electrical control in conjunction with a hydraulic driving mechanism for a machine of the class described.

In this art there is a certain maximum gap spacing at which spark discharge will begin to occur, but at this maximum distance the discharge is weak in current. As the electrode moves through this gap or sparking range, toward the work, the electrical load becomes greater and therefore the current becomes greater. In the prior art, so far as I am aware, there is nothing shown whereby the electrode may be maintained at any given position within the sparking range and thereby accurately control the amperage or current of the spark discharges.

Since the amount of metal removal per spark is dependent upon the current of the spark for a given spark voltage, this becomes important in controlling the cutting of different materials, the kind of finish, and the rate of cutting.

It is, therefore, another object of this invention to provide a machine of the character described in which the electrode may be positioned and maintained at any point within the sparking range of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The accomplishment of the above-stated objects of my invention has resulted in the provision not only of a new method of control, but also a new form of apparatus cooperating in a novel manner with the electrode controlled thereby.

In the drawings, in which like reference numerals indicate like or similar parts.

Figure 1:
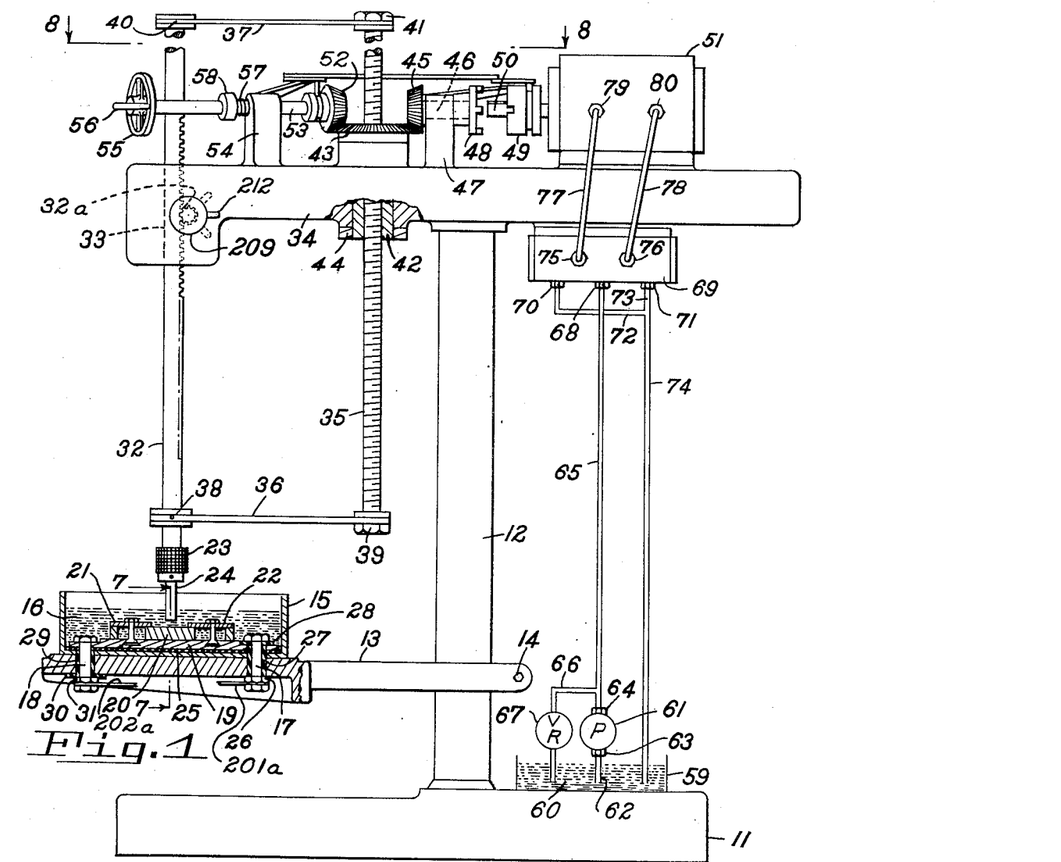
Figure 1 is a side elevation of a machine embodying the principles of this invention.

The principles of my invention have been embodied in a machine, shown in Figure 1, which is in the form of a sliding head drill press and which constitutes a good example of a machine having a tool which is relatively movable with respect to a workpiece for performing a machining operation thereon. However, it will become apparent from a careful study of the following description of my novel control method and apparatus that the same could be applied to other forms of machine tools with equal facility.

Method

Figure 5:
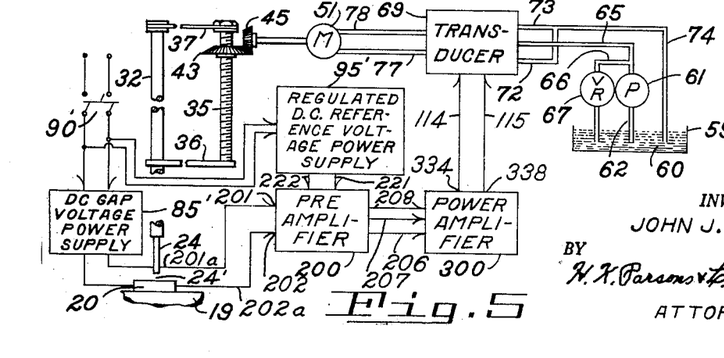
Figure 5 is a diagrammatic view illustrating the method which is employed in controlling the positioning of the electrode relative to the workpiece.

In my proposed method for automatically and precisely controlling the relative position of an electrode such as 24 in Figure 5 with respect to a workpiece 20, I utilize a change in the electrical conditions across the discharge gap 24' between the two caused by variations in gap distance to indicate the degree and direction of changes to be made in the gap distance. A change in the electrical condition in the discharge gap may be defined as a change in gap voltage, gap current, or both simultaneously.

In this method I connect a source of pulsating electrical energy indicated generally by the reference numeral 85', Figure 5, across the gap to effect the machining operation, and I connect in parallel therewith a supplemental or shunt circuit 201a, 202a in which a voltage is generated by said source which may be equal to or proportional to the average of the gap discharge pulsating voltage, and I compare this voltage with a second reference voltage which I generate from a second source of electrical energy 95'. I utilize the difference between these voltages to generate an electrical "error" signal which is proportional to the algebraic difference between the compared voltages. The magnitude and polarity of this "error signal" is thus dependent upon the amount of increase or decrease in gap distance, and it constitutes means to indicate the degree and direction of the change to be made in the gap distance.

I have provided a power driving mechanism for feeding the electrode 24 into the work 20 in accordance with variations in gap distance, and if the rate of metal removal was constant, the rate of feed would be constant; but due to the nature of this operation, this is not true because the rate of change is not constant. Since these changes may call for sudden reversals in direction, I prefer to utilize a low inertia prime mover, such as a hydraulic motor 51, Figure 1, for actuating the driving mechanism to reduce possible overrun when reversals are effected. Since I utilize a hydraulic motor, I have provided a transducer mechanism 69, Figure 1, which is responsive to said changes in the magnitude and polarity of said "error" signal to control the rate and direction of the hydraulic motor. Thus, the hydraulic motor is continuously acting to maintain a constant gap distance, while the rate of cutting is constantly acting to change the gap distance.

Therefore, it can be seen that a new and improved "closed-loop" and "null-seeking" form of servo-mechanism control for an electric-discharge machine has been devised.

Apparatus

The machine illustrated in Figure 1 of the drawings has a base 11 on which is supported a cylindrical column 12. A table 13 has a cylindrical bore by which it is mounted on the column 12 for vertical adjustment thereon and may be clamped thereto by a clamping bolt 14. A tank 15 containing a dielectric coolant 16 is mounted on the table 13 and secured thereto by bolts 17 and 18. A work support 19 is mounted within the tank 15 and secured thereto also by bolts 17 and 18. A workpiece 20 is secured to the work support 19 by suitable clamping means 21 and 22. A chuck 23 is provided for holding the tool electrode 24.

Bolts 17 and 18 not only serve to hold the work support 19 and tank 15 in a fixed position relative to the table 13, but they also serve as terminals for the power supply 95' which is connected across the discharge gap 24'. Bolt 17 constitutes one terminal of the electric circuit, and therefore is electrically insulated from bolt 18 in the following manner. The work support 19 is insulated from the tank 15 by means of an insulating member 25 interposed therebetween. Bolt 17 is electrically connected to the table 13 and thereby to the electrode 24 by means of a nut 26 threaded thereon, but is insulated from the work support 19 by means of a fiber insulating tube 27 and a fiber insulating washer 28. Bolt 18 is electrically connected to the work support 19 but insulated from the tank 15 and the table 13 by means of an insulating fiber tube 29 and an insulating fiber washer 30 held fixed by nut 31 threaded on said bolt 18. Therefore, it can be seen that bolt 17 is electrically connected to the table 13, electrode 24, and the tank 15' whereas bolt 18 is electrically connected to the work support 19, and work 20, while at the same time each bolt is electrically insulated from the other.

The tool electrode 24 may be composed of any suitable electrical conducting material and may be suitably shaped, depending upon the shape of hole or depression to be cut on the workpiece 20. Since it is good practice to perform the machining operation in the presence of the coolant 16, the electrode 24 is preferably hollow so that the coolant 16 may be circulated therethrough, from a pressure source not shown, to the discharge gap area 24' and into the tank 15 from which it may be recirculated by said pressure source.

The chuck 23 and contained electrode is supported for movement toward and from the work by an axially movable shaft or rod 32 which is guided in a bore 33 formed in a cross arm member 34 integrally attached to the top of the column 12. The shaft 32 receives its axial movement from a lead screw 35 which is connected thereto by cross members 36 and 37. Cross member 36 is connected to the lower end of the shaft 32 by means of a set screw 38 and is connected to the lower end of the lead screw 35 by means of a bolt 39 threaded into the lower end thereof. Cross member 37 is connected to the upper end of the shaft 32 by means of a set screw 40, and is connected to the upper end of the lead screw 35 by means of a bolt 41 threaded into the upper end thereof.

The lead screw 35 is supported and threaded in a nut 42, which is journaled in the cross arm 34 and held against axial movement by a collar 44 threaded on the end of nut 42. As we are maintaining a discharge gap distance within extremely close tolerances, it is essential that there be no lost motion between the screw 35 and nut 42, and therefore a good construction is to utilize an Acme threaded nut and screw.

The actual feeding movement of electrode 24 is effected by rotation of the nut 42. To this end bevel gear 43 is formed on the upper end of the nut 42 in mesh with and power driven by a bevel gear 45. The bevel gear 45 is supported on the end of a shaft 46 journaled in a bearing 47 formed on the cross arm 34. The shaft 46 is free to rotate, but axial movement is prevented by a clutch member 48 attached to the end of shaft 46. The clutch member 48 is normally engaged with and driven by a second clutch member 49 which is splined on a shaft 50 which constitutes the drive shaft of a prime mover 51.

Thus, it can be seen that normally the electrode 24 is power driven by the prime mover 51, but additional mechanism has been provided whereby movement of the electrode 24 may be manually effected if so desired. Such a mechanism consists of a bevel gear 52 attached to a shaft 53 which is slidably mounted in a bearing 54 attached to the cross arm 34. The shaft 53 terminates in a hand wheel 55 having a crank handle 56 attached thereto in such a manner that rotation of the wheel 55 will cause rotation of the bevel gear 52. The bevel gear 52 is normally held out of engagement with bevel gear 43 by action of a spring 57 interposed between the bearing 54, and a collar 58 which is mounted on the shaft 53.

Figures 4, 6, 7, 8:
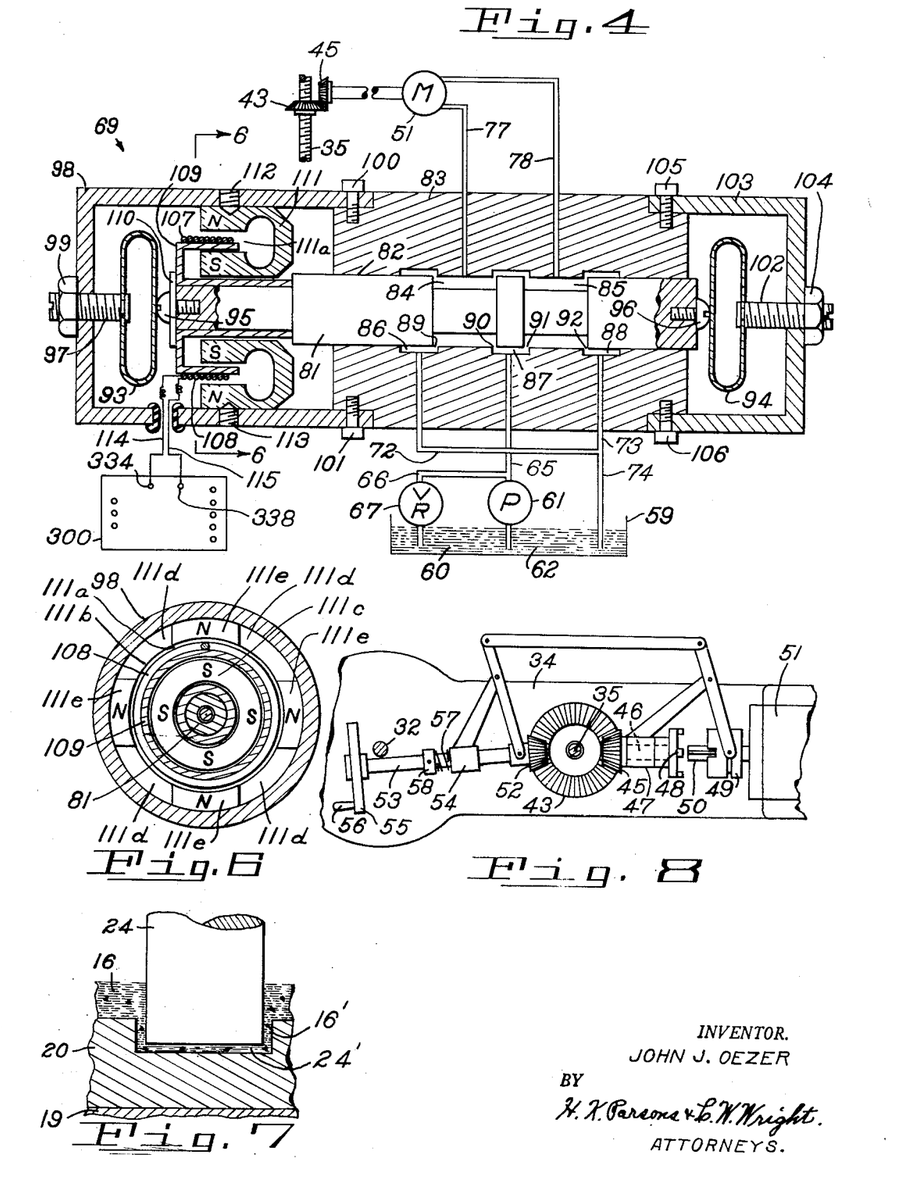
Figure 4 is a diagrammatic view illustrating the electrohydraulic transducer and hydraulic circuit connected thereto.
Figure 6 is a sectional view on the line 6—6 of Figure 4 through the electro-magnetic moving coil mechanism.
Figure 7 is a detail view of the discharge gap area as viewed on the line 7—7 of Figure 1.
Figure 8 is a detail view of the clutch control mechanism as viewed on the line 8—8 of Figure 1.

A clutch shifting mechanism, as shown in Figure 8 of the drawings, has been provided whereby the clutch member 49 may be disengaged from the clutch member 48, and the bevel gear 52 engaged with the bevel gear 43, so that movement of the electrode 24 may be manually controlled by rotation of the hand wheel 55.

Since it is desired to have the electrode driving mechanism responsive to electrical variations at the discharge gap as the gap distance varies, and since it is also desired to use the hydraulic motor as a prime mover, an electro-hydraulic transducer mechanism 69 has been provided which functions in the following manner:

A reservoir or tank 59 containing a suitable hydraulic fluid 60 is mounted on the base 11 of the machine in any conventional manner. A pressure source in the form of a hydraulic pump 61 is provided whereby the hydraulic fluid 60 is withdrawn from the reservoir through suction line 62, into suction port 63 and discharged through delivery port 64 into a pressure supply line 65 which has a branch line 66 containing a relief valve 67. Hydraulic fluid 60 from line 65 is delivered to pressure port 68 of a transducer indicated generally by numeral 69. The transducer has a pair of exhaust ports 70 and 71 connected to lines 72 and 73 respectively, and thence returned to reservoir 59 by way of line 74. The transducer also has a pair of motor ports 75 and 76 connected by lines 77 and 78 to ports 79 and 80 respectively of the hydraulic motor 51.

The hydraulic motor 51 may be of any conventional rotary type such as the one shown in Letters Patent No. 2,492,688, issued December 27, 1949. The rate and direction of rotation of said motor 51 is dependent upon the rate and direction of flow through lines 77 and 78, and this is governed by the transducer 69.

With reference to Figure 4 of the drawings, the transducer 69 contains an annular grooved valve plunger 81 which is axially slidable in a bore 82 of a valve housing 83. The annular grooves 84 and 85 formed on the plunger 81 are of such dimensions that they overlap the ports 86, 87 and 88 formed in the valve body 83 so as to form hydraulic resistances 89, 90, 91, and 92. The plunger 81 is normally held in a centered position with respect to the ports 86, 87, and 88 by the action of centering springs 93 and 94, which press against bolts 95 and 96 respectively threaded in either end of the plunger 81. The pressure exerted by the spring 93 on the bolt 95 is adjustable by means of a screw 97 attached thereto, and threaded into an end frame 98, and locked thereto by a lock nut 99 threaded on the screw 97.

The end frame 98 is pressed onto the valve body 83 and secured thereto by bolts 100 and 101 threaded therein. The pressure exerted by the spring 94 on the bolt 96 is also adjustable by means of a screw 102 attached thereto and threaded into an adjacent end frame 103, and locked thereto by lock nut 104 threaded on the screw 102. The end frame 103 is pressed onto the valve body 83 and secured thereto by bolts 105 and 106 threaded therein. Thus, it can be seen that the pressure fluid 60 as delivered to port 87 will be divided by equal resistances 90 and 91 and will flow into the grooves 84 and 85. The pressure fluid will flow out of these grooves 84 and 85 through equal resistances 89 and 92. Since the hydraulic resistance "in" is equal to the hydraulic resistance "out," the intermediate pressures in grooves 84 and 85 is equal to one-half the fluid pressure at port 87. Since the pressure in groove 84 will equal the pressure in groove 85 when the plunger 81 is centered, the pressure in lines 77 and 78 will be equal and therefore the motor 51 will not rotate but will be held hydraulically locked by the opposing equal pressures thereon.

Therefore, it will be evident that even the slightest axial movement of the plunger 81 will cause an immediate change in the ratio of resistance 90 to resistance 89; and resistance 91 to resistance 92, such that there will be a pressure differential created in lines 77 and 78 to cause the motor 51 to rotate at a speed and in a direction proportional to said pressure differential. Since a highly sensitive driving mechanism is desirable, it is essential that the slightest linear movement of the plunger 81 be immediately converted into rotary movement of the motor 51, and axial movement of the electrode 24. Therefore, means have been devised whereby the movement of the plunger 81 can be controlled accurately and precisely by an electrical signal derived from a change in the electrical conditions existing across the discharge gap 24'.

To that end, a moving-coil electro magnet 107 has been provided in the transducers 69 which consists of many turns of wire 108 wound about the circumference of a non-ferrous coil form 109, such as aluminum or any other similar material. The coil assembly 107 is then pressed onto one end of the plunger 81 and held secured thereto by a washer 110 and screw 95 threaded therein. The plunger 81 acts as a support and guide for the moving-coil assembly 107.

A permanent magnet 111 is pressed into the end frame 98 and held secured thereto by set screws 112 and 113. The permanent magnet 111 is in the form of an annular ring having an annular groove 111a cut in one end to form concentric opposite polarity pole pieces 111b and 111c thereon, such as shown in Figure 6 of the drawings. The pole piece 111b has slots 111d cut therein to form individual poles 111e. The coil 108 is positioned in this annular groove 111a in the path of the flux flowing from said opposite pole pieces 111e and 111c, but its movement is unaffected thereby until the energizing current of said electric signal flows therein. When the signal current flows through the coil 108 in one direction, it causes a reaction to shift the valve to one side of center, and when the current flows through the coil 108 in the other direction, the valve is shifted to the other side of center. This is similar to "motor action." The coil 108 terminates in conductors 114 and 115 which are connected respectively to output terminals 334 and 338 of a power amplifier circuit 300 whose output signal is dependent upon the electrical conditions existing across the discharge gap.

The signal thus supplied to the conductors 114 and 115 energizes the coil assembly 107 and causes movement of the plunger 81 in either direction from neutral to a distance where the force exerted by the centering springs 93 and 94 becomes equal and opposite to the force produced by said energizing signal. Movement of the plunger 81 is due to the well-known "motor action," that is, the interaction between the reversible magnetic flux produced by the electromagnet coil assembly 107 and the unidirectional magnetic flux produced by the permanent magnet 111. The sensitivity of the movement of the plunger 81 may be adjusted to any desired value by proper adjustment of the tension exerted by the centering springs 93 and 94.

As previously mentioned in the description of the method, the electrical signal utilized here is derived from the difference in voltage between the reference voltage and a proportional part of the gap voltage, and it is desired to point out here that the spring adjustment is such that only a small difference of approximately five volts is sufficient to move the valve to its wide open position. Thus a highly sensitive and fast acting control has been provided wherein a few volts difference will cause full speed operation of the hydraulic motor in one direction or the other.

Figure 2:
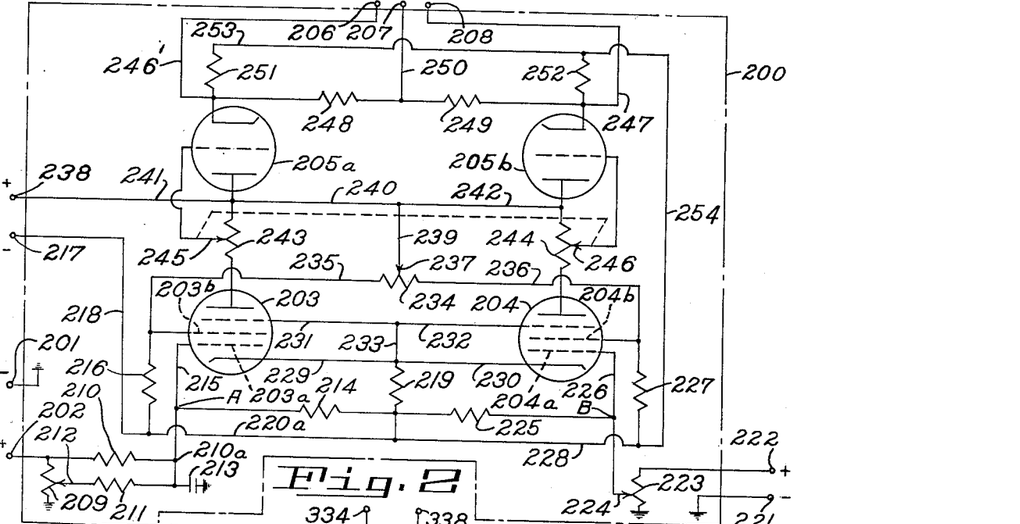
Figure 2 is a schematic electrical diagram of the pre-amplifier circuit.
Figure 3:
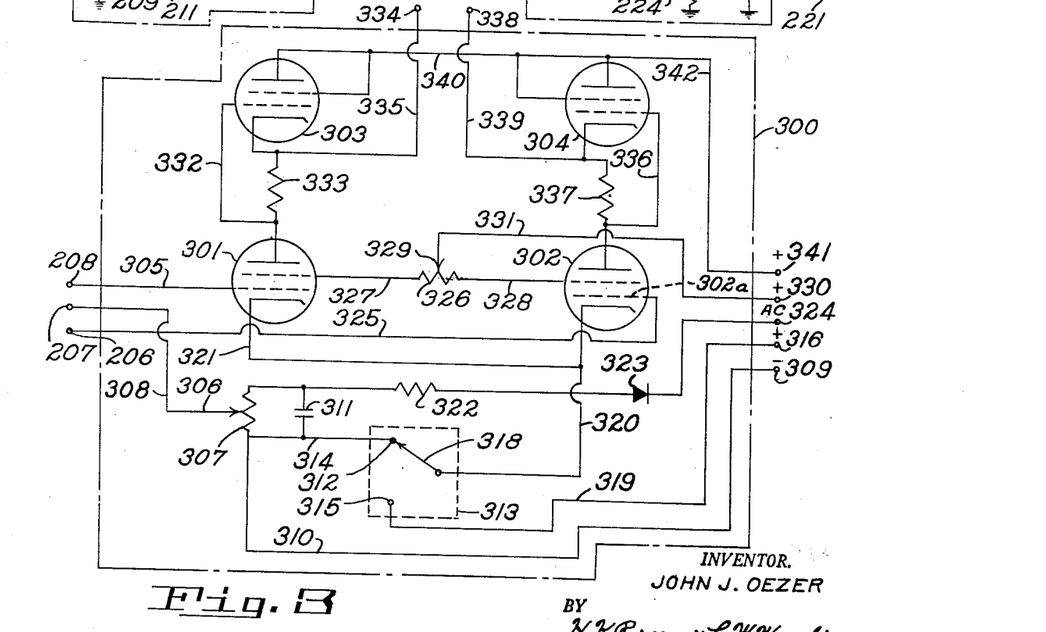
Figure 3 is a schematic electrical diagram of the power amplifier circuit.

The power amplifier circuit 300 shown in Figure 3 is connected to the discharge gap 24' through a second preamplifier circuit 200 shown in Figure 2 in such a manner that the pulsating voltage from power supply 85' across the gap will appear across terminals 201 and 202, of circuit 200, which are connected by conductors 201a and 202a to the electrode 24 and the workpiece 20 respectively as shown in Figure 1. The electrode 24 and the workpiece 20 are electrically connected for control of the control grids 203a, 204a of vacuum tubes 203 and 204 respectively. The tubes 203 and 204 represent the input circuit of the preamplifier 200 and are pentode type, direct-current amplifier tubes which are operated class A with a push-pull input. The tubes 203 and 204 drive a pair of triode type, direct-current amplifier tubes 205a and 205b which are cathode followers operated class A having push-pull output. The push-pull output signal from the preamplifier 200 is fed to output terminals 206, 207, and 208, which form the input terminals of the power amplifier circuit 300 as shown in Figure 3.

The power amplifier 300 consists of four power amplifier vacuum tubes 301, 302, 303, and 304, which constitute the four active arms of a Wheatstone bridge type circuitry. The conductors 114 and 115 of the transducer coil 108 are connected to the output terminals 334 and 338 respectively of the power amplifier 300 so that any unbalance in the bridge will cause an unbalanced current flow through the transducer coil 108. The direction of current flow will be in the direction of the bridge unbalance and thus will determine the direction of rotation of the hydraulic motor 51.

Thus, it can be seen that any change in the average gap discharge voltage will cause an immediate unbalance of the normally balanced preamplifier 200 which, in turn, will cause an immediate unbalance of the normally balanced power amplifier 300, such that a control signal or current will flow in one direction or the other through the transducer coil 108, which will be proportional to and have a polarity which is indicative of the amount and direction of change of the gap voltage above or below the preset reference voltage.

With reference to Figure 2, the terminals 201 and 202 are connected to the electrode 24 and to the workpiece 20 respectively as heretofore stated. The terminal 201 is returned to ground potential, whereas the terminal 202 is connected to the upper end of a potentiometer 209 and is also connected to a resistor 210. The lower end of the potentiometer 209 is returned to ground potential. A resistor 211 has one end connected to a movable arm 212 of the potentiometer 209, and the other end connected to the terminal 210a of resistor 210. The terminal 210a is returned to ground potential through a by-pass condenser 213 and is connected also to a control grid resistor 214 and to the control grid of the amplifier tube 203 through a conductor 215.

The screen grid 203b of the tube 203 is connected to a resistor 216 which is returned to a negative terminal 217 of a conventional direct-current power supply, not shown, through conductor 218. The screen resistor 216 is also connected to a resistor 219 through a conductor 220a which represents a common cathode resistor for the tubes 203 and 204. A reference voltage which is supplied by a conventional regulated direct-current power supply, not shown, is brought in at terminals 221 and 222. The terminal 221 is returned to ground potential whereas terminal 222 is connected to the upper end of a potentiometer 223. The lower end of the potentiometer 223 is connected to ground potential. A movable arm 224 of the potentiometer 223 is connected to a control grid resistor 225, and also connected to the control grid 204a of the tube 204 through a conductor 226. The screen grid 204b of the tube 204 is connected to a resistor 227 and returned to the negative terminal 217 of the aforementioned direct-current power supply by way of a conductor 228, through the conductors 220a and 218. The screen resistor 227 is also connected to the common cathode resistor 219 through the conductor 228. The cathode of tube 203 is connected to the cathode of tube 204 through conductors 229 and 230.

The suppressor grid of the tube 203 is connected to the suppressor grid of the tube 204 through conductors 231 and 232. The suppressor grids of the tubes 203 and 204 are then returned to their cathodes and also connected to their common cathode resistor 219 through a conductor 233. The screen grid 203b of the tube 203 is connected to one end of a potentiometer 234 through a conductor 235, whereas the screen grid 204b of the tube 204 is connected to the other end of the potentiometer 234 through a conductor 236. A movable arm 237 of the potentiometer 234 is connected to a positive terminal 238 of the aforementioned direct-current power supply through conductors 239, 240, and 241.

The plate of the tube 205a is connected to the plate of the tube 205b through conductors 240 and 242. These plates are then connected to the positive terminal 238 of the aforementioned direct-current power supply. The plate of the tube 203 is connected to one end of a potentiometer 243 whereas the plate of the tube 205a is connected to the other end of the potentiometer 243. The plate of the tube 204 is connected to one end of a potentiometer 244 whereas the plate of the tube 205b is connected to the other end of the potentiometer 244. The control grid of the tube 205a is connected to a movable arm 245 of the potentiometer 243 whereas the control grid of the tube 205b is connected to a movable arm 246 of the potentiometer 244. The movable arm 245 of the potentiometer 243 is mechanically connected to the movable arm 246 of the potentiometer 244 to form a dual-pot potentiometer for a "sensitivity control."

The cathode of the tube 205a is connected to the output terminal 206 through a conductor 246', and the cathode of tube 205b is connected to the output terminal 208 through a conductor 247. The cathode of the tube 205a is connected to the cathode of the tube 205b through a resistor 248 and a resistor 249. The cathode of the tube 205a is connected to the output terminal 207 through the resistor 248 and a conductor 250, whereas the cathode of the tube 205b is connected to the output terminal 207 through the resistor 249 and the conductor 250, thus giving a push-pull output. The cathode of the tube 205a is connected to a resistor 251, and the cathode of the tube 205b is connected to a resistor 252. The other end of the cathode resistor 251 of the tube 205a is connected to the remaining end of the cathode resistor 252 of the tube 205b through a conductor 253, which in turn is then connected to the common cathode resistor 219 of the tubes 203 and 204 by a conductor 254 and the conductor 228.

In order to obtain a clear understanding, and by way of illustration, of the aforementioned amplifier stage, the circuit will be discussed and described by way of an example of the actual working conditions.

The input tubes 203 and 204 of the preamplifier 200 are identical type pentode amplifier tubes, and the common cathode resistor 219 creates a slight negative bias for the tubes 203 and 204 and thus will establish similar operating points on their respective similar dynamic transfer characteristic curves. Assuming that the electrode 24 has moved away from the workpiece 20, the gap voltage as supplied to terminals 201 and 202, and thus the voltage measured from point A to ground will increase above the preset value of the reference voltage as measured from the point B to ground.

The condenser 213, connected from the control grid 203a of the tube 203 to ground, constitutes a low impedance path for the frequency of pulsations of the gap voltage and thus maintains at all times a constant voltage at point A proportional to the average gap voltage. The difference between the average gap voltage at point A and the value of the reference voltage at point B, which we will call an "error voltage," will appear across the series resistors 214 and 225, and consequently will drive the control grid of one input tube less negative, and the other more negative with respect to their cathode due to the push-pull arrangement of the input circuitry.

Therefore, it can be seen that the voltage at point A will rise above the voltage at point B, and the control grid 203a of tube 203 will become less negative with respect to its cathode whereas the control grid 204a of tube 204 will become more negative with respect to its cathode. This condition will cause the tube 203 to draw more plate current, and the tube 204 to draw less plate current, thus causing the plate voltage of the tube 204 to increase above the value of the plate voltage of tube 203.

The dynamic resistance of the tube 203 will decrease due to the increase of plate current flow, whereas the dynamic resistance of tube 204 will increase due to its decrease of plate current flow. Therefore, the control grid of the tube 205b will be driven less negative with respect to its cathode whereas the control grid of the tube 205a will be driven more negative with respect to its cathode. The amount by which the control grid voltage of the tube 205b decreases below the control grid voltage of the tube 205a will be dependent upon the setting of a "sensitivity control" which consists of a dual slider arrangement consisting of movable arms 245 and 246 of the potentiometers 243 and 244.

As the output tubes 205a and 205b are connected as cathode followers, the cathode voltage of the tube 205a as appearing across the cathode resistor 251 will decrease below its normal value, and the cathode voltage of the tube 205b as appearing across the cathode resistor 252 will increase above its normal value. The output of the tubes 205a and 205b are connected push-pull through the resistors 248 and 249 so that the output voltage as measured from terminal 206 to terminal 207 will be less than the voltage as measured from terminal 208 to terminal 207; terminal 207 being the center tap of the normally balanced output of the tubes 205a and 205b. If the "error voltage" reverses polarity due to the electrode 24 moving closer to the workpiece 20 from its original position, the output voltage polarity will also reverse. If there is no "error voltage," such as when the average gap voltage at point A is equal to the value of the reference voltage at point B, the output of tubes 205a and 205b will be equal and balanced.

The dual potentiometers 243 and 244 control the magnitude of the amplified error signal to be delivered to the tubes 205a and 205b, thus giving the sensitivity control so that the overall circuit gain can be adjusted from maximum to zero without altering the gap voltage and thus interfere with the machining operation.

The screen voltage of the tubes 203 and 204 is adjustable by means of the voltage dividing network consisting of the potentiometer 234 and the resistors 216 and 227. Thus, by proper adjustment of the potentiometer 234, the entire preamplifier circuit may be balanced. The unbalance may be caused by tubes having dissimilar dynamic transfer characteristics, component tolerance variations, and component aging, etc.

There are two conditions under which the servo-control system must operate. One condition is during the discharge machining process when a movement of the electrode 24 with respect to the workpiece 20 will cause a change in "error voltage." The other condition is during rapid traverse of the electrode 24 in an open circuit condition such that the movement of the electrode 24 will cause no change in the error voltage because there is no change in the load exerted on the gap voltage power supply. If the electrode 24 is raised after a cutting operation to a non-working position, it is held stationary by adjustment of the reference voltage potentiometer 223 so as to make the reference voltage at point B equal to the gap open circuit voltage at point A. However, if the electrode 24 would tend to drift, there would be no change in the "error voltage" to compensate for this drift.

Drift by the electrode 24 may be caused by such things as physical disturbances or even hydraulic unbalance. Such drift may be eliminated by the addition of a voltage divider network across the discharge gap consisting of the potentiometer 209 and resistors 210 and 211. The movable arm 212 of the potentiometer 209 is mechanically connected by a rack and gear connection 32a to the shaft 32 of the machine, Figure 1, so that the voltage at point A will be changed with any movement of the electrode 24, whether during a machining operation or not.

The voltage divider resistor network consisting of resistors 210 and 211 is utilized to prevent the voltage at point A from going to zero. Therefore, the voltage at point A is maintained at a range of one-half gap voltage to full gap voltage.

The output terminals 206, 207, and 208 of the preamplifier 200, as shown in Figure 2 of the drawings, also constitute the input terminals for the power amplifier circuit 300 as shown in Figure 3 of the drawings. In this circuit, four similar type amplifier vacuum tubes 301, 302, 303 and 304 are connected to constitute the four active arms of a Wheatstone bridge type amplifier circuitry. The control grid of the tube 301 is connected to the terminal 208 by a conductor 305. The terminal 207 is connected to a movable arm 306 of a bias potentiometer 307 by a conductor 308. The lower end of the bias potentiometer 307 is connected to a negative terminal 309 of a conventional direct current supply, not shown, by a conductor 310, and is also connected to one end of a condenser 311, and to a terminal 312 of a two-position "standby" switch 313 by a conductor 314. A lower terminal 315 of the switch 313, which represents the second position of the said switch 313, is connected to a positive terminal 316 of the said power supply by a conductor 319.

A movable arm 318 of the switch 313 is normally electrically connected to the terminal 312 of said switch 313, and is connected to the cathode of the tube 302 by a conductor 320. The cathodes of the tubes 301 and 302 are connected together by a conductor 321, thereby making a portion of the potentiometer 307 the common cathode resistor for both the tubes 301 and 302. The upper end of the potentiometer 307 is connected to the other end of the condenser 311 and to a resistor 322 which, in turn, is connected to the cathode of a crystal diode rectifier 323.

The plate of the said diode 323 is connected to an alternating-current potential terminal 324 of an alternating current power supply not shown. The control grid 302a of the tube 302 is connected to the terminal 206 by a conductor 325. The screen grid of the tube 301 is connected to one end of a potentiometer 326 by a conductor 327, whereas the screen grid of the tube 302 is connected to the other end of the potentiometer 326 by a conductor 328. A movable arm 329 of the potentiometer 326 is connected to a positive terminal 330 of the D. C. power supply by a conductor 331. The plate of the tube 301 is connected to the control grid of the tubt 303 by a conductor 332, and is also connected to a resistor 333, while the cathode of the tube 303 is connected to the other end of the resistor 333 and to an output terminal 334 by a conductor 335. The plate of the tube 302 is likewise connected to the control grid of the tube 304 by a conductor 336, and is also connected to a resistor 337, whereas the cathode of the tube 304 is connected to the other end of the resistor 337, and is also connected to an output terminal 338 by a conductor 339. The plates of the tubes 303 and 304 are connected to their respective screen grids so that the said tubes 303 and 304 will operate as triodes. The plate and the screen grid of the tube 303 are both connected to the plate and the screen grid of the tube 303 by a conductor 340, and then are connected to a positive terminal 341 of the D. C. power supply by a conductor 342.

When the voltage between the input terminals 208 and 207 is equal to the voltage between the input terminals 206 and 207, indicating there is no "error voltage," the bridge balancing or the voltage across the output terminals 334 and 338 can be adjusted to equal zero by changing the screen grid voltage on the tubes 301 and 302 by proper adjustment of the slider 329 of the potentiometer 326, which in turn, alters the zero-signal dynamic resistance of the tubes 301 and 302.

In addition to the self-bias developed by the tubes 301 and 302, the alternating potential as appearing at the terminal 324 of the aforementioned power supply is rectified and filtered by action of the crystal diode rectifier 323 and the filtering network consisting of the resistors 322 and 307 and the condenser 311. Therefore, the bias potentiometer 307 may be used as a variable gain control, if so desired, which will limit the zero-signal current flow through the power amplifier 300. Since the cathodes of the tubes 301 and 302 are at equal potential, the said tube filaments may be supplied by a common filament supply, not shown, whereas the cathodes of the tubes 303 and 304 will at times be at a higher potential than the cathodes of the tubes 301 and 302, and, therefore, the tubes 303 and 304 have a separate filament supply, also not shown.

A "cut-off" voltage, as supplied by the positive terminal 316 of the aforementioned D. C. power supply, is fed to the terminal 315 of the "stand-by" switch 313. Thus, as the movable arm 318 of the switch 313 is moved downward from its normal operating position as shown, a positive "cut-off" voltage will be applied through the conductor 320 to the cathodes of the tubes 301 and 302, thus making the power amplifier 300 inoperative so that the hydraulic motor 51 and thus the electrode 24 will be held in a locked position.

It can be seen that since the power amplifier 300 is connected push-pull and driven by the output of the preamplifier 200, any change in the voltage appearing at the input terminals 206, 207 and 208 will either increase or decrease the bias on the tubes 301 and 302 which, in turn, will alter their respective dynamic resistances to the extent that the Wheatsone bridge type power amplifier 300 will no longer be balanced, but instead will be unbalanced such that a direct-current signal will flow through the output terminals 334 and 338, and said signal will have an amplitude and polarity proportional to the degree and direction of the bridge unbalance, which in turn, will be proportional to the magnitude and polarity of the "error voltage."

It has been assumed that the electrode 24 has moved away from the workpiece 20 such that the voltage as measured from the terminal 206 to the terminal 207 has decreased and that the voltage as measured from the terminal 208 to the terminal 207 has increased where the terminal 207 is the center tap of the normal balanced output from the tubes 205a and 205b as shown in Figure 2. Therefore, the control grid voltage of the tube 301, as measured with respect to its cathode, will go less negative and the control grid voltage of the tube 302 as measured with respect to its cathode will go more negative. The plate current of the tube 301 will increase due to its control grid going less negative, thus decreasing its dynamic resistance, whereas the plate current of the tube 302 will decrease due to its control grid going more negative, thus increasing its dynamic resistance.

As the plate current through the tube 301 is increased, a greater voltage drop will appear across the resistor 333. This increase of voltage drop will put a greater negative bias on the control grid of the tube 303, thus causing its dynamic resistance to increase. As the plate current through the tube 302 has decreased the voltage drop across the resistor 337 will also decrease. This decrease in voltage drop across resistor 337 will put a less negative bias on the control grid of the tube 304, thus causing the dynamic resistance of the tube 304 to decrease. At this point, the dynamic resistance of the tubes 301 and 304 are decreased, and the dynamic resistance of the tubes 302 and 303 are increased, thereby causing an unbalanced bridge current to flow from the tube 304 through the output terminal 338, through the transducer coil 108 connected thereto, and back through terminal 334 to the tube 301. If the input signal polarity were reversed, the tubes 302 and 303 would develop the lowest dynamic resistance, and the current would flow in an opposite direction through the transducer coil 108.

The signal thus flowing through the transducer coil 108 will cause the plunger 81 to move axially such that the hydraulic motor 51 will rotate in a direction at a speed proportional to the "error voltage," and thus the electrode 24 will be moved closer to the workpiece 20 to a distance proportional to said "error voltage." Thus, again we have established a closed-loop or null-seeking servomechanism for accurately and precisely controlling the relative movement of the electrode 24 relative to the workpiece 20.

Having fully described the machine and control circuit, a summary of the operation is as follows:

The lead screw 35 and thus the shaft 32 can be manually moved away from the table 13 in order to allow clearance to accommodate mounting of the workpiece 20. This can be done by axially shifting the handwheel 55 to engage bevel gears 43 and 52 and at the same time operatively disengaging the hydraulic motor 51. The handwheel 55 may now be rotated to retract the shaft the desired amount so that the electrode 24 may be inserted in the chuck 23, and the workpiece 20 may be secured to the work support 19 by clamps 20 and 21. The gap voltage supplied by the power supply 85' is connected to the terminals 17 and 18 by closing the line switch 90'. If the maximum open circuit gap voltage is assumed to be 70 volts, the reference voltage, as provided by power supply 95', may now be adjusted to 70 volts by potentiometer 223, Figure 2, and since the gap voltage now equals the reference voltage, the transducer valve will be centralized, and the hydraulic motor will be held stationary when reconnected to the screw, and the electrode 24 will not move.

By adjusting the reference voltage to 17 volts, which is substantially equivalent to a gap spacing of .0008", the transducer valve will be shifted to maximum open position, and the electrode 24 will be rapid traversed toward the workpiece 20 as long as the voltage differential between the gap voltage and the reference voltage exceeds approximately 5 volts. As the electrode 24 moves toward the workpiece 20 the auxiliary potentiometer 209 is rotated until the gap voltage is decreased to 35 volts. At this point the electrode 24 will be spaced approximately .003" from the workpiece 20, which is sufficient to ionize the gap to a point that a series of electrical discharges will be fired across the gap. Since the voltage differential still exceeds five volts, the electrode 24 will continue to rapid traverse toward the workpiece 20, but the average gap voltage will continue to decrease because the gap current will increase on account of the load becoming greater with an unregulated power supply 85'. Therefore, the electrode 24 will rapid traverse until the average gap voltage has decreased to 22 volts corresponding to .0013" gap spacing.

The voltage differential at this point will be five volts which is the amount necessary to hold the transducer valve completely open. Further decrease in the voltage differential will cause the transducer valve to reduce the speed of the hydraulic motor 51. This will decelerate the movement of the electrode 24 until the average gap voltage reaches 17 volts, which will now be equal to the setting of the reference voltage. The motor 51 will now stop and will not rotate again until the electrical discharges have removed enough metal to increase the size of the discharge gap. This increase in gap distance will cause an increase in the average gap voltage above the value of the reference voltage and will cause an "error signal" to be generated which will reposition the electrode 24 an amount equal to the gap increase.

If, however, the electrode 24 should become short-circuited to the workpiece 20 due to metal particles 16' being lodged therebetween as they move out of the gap area as shown in Figure 7, the gap voltage will suddenly go to zero, and a negative "error signal" will be generated in circuit 200 which will cause the hydraulic motor 51 to reverse rotation and immediately retract the electrode 24 until the short circuit has been broken. After the short circuit has been removed, the electrode 24 will be traversed back to its original cutting position.

If it becomes necessary to retract the electrode 24, such as for taking measurements, and so forth, the reference voltage may be set to, say 60 volts, depending upon the desired retraction distance, and the electrode 24 will be retracted at a rapid traverse rate until the open circuit gap voltage equals 60 volts. The electrode 24 will then stop and be held in a locked position.

It will be noted from the foregoing description that sparking across the gap began when the gap distance was equal to approximately .003" but that the electrode was moved further to decrease the gap spacing to .0008". This, in effect, means that the amperage of the spark discharge was continually increased during movement through this distance. Thus, the amperage is dependent upon the gap distance, which in turn is dependent upon the setting of the reference voltage, whereby it should now be evident that the reference voltage control is also a control for the amperage of the spark discharges, and that the electrode can be automatically held at any position within the sparking range from .003" to zero.

Although I have described my method and apparatus for a sensitive servo-control and therefore have used certain specific terms and language herein, it is to be understood that the present disclosure is illustrative rather than restrictive and that changes and modifications may be resorted to without departing from the spirit and scope of the claims which follow.

Having thus fully described my invention, what I claim as new and useful and desire to secure by United States Letters Patent is:

1. In an electric discharge machine for removing material from an electrically conductive workpiece, the combination of a work support for said workpiece, an electrode tool, a reversible hydraulic motor operatively connected with said tool for feeding the tool toward and from the workpiece to change the gap between them, an electrical potential supply connected in circuit with said tool and workpiece to create a voltage across said gap which will ionize the gap at a predetermined spacing and produce pulsating electric discharges across the gap, a shunt circuit connected across the gap in which the average voltage of said discharges will appear, a variable reference voltage circuit coupled to said shunt circuit by means determining any algebraic difference between the reference voltage and the average voltage, means to amplify the positive or negative voltage difference, reactive shifting means for reversible energization by said positive or negative voltage difference to effect forward or reverse shifting thereof, and valve means operated by said shifting means for reversibly connecting a source of pressure to said hydraulic motor.

2. In an electric discharge machine having a tool electrode and a work electrode, the combination of a reversible hydraulic motor for effecting relative movement of one electrode toward and from the other to vary the gap spacing therebetween, a source of hydraulic pressure, valve means for reversibly connecting said source of pressure to said hydraulic motor, said valve means having a central position and graduated positions on either side thereof, a source of pulsating direct current connected to said electrodes to effect a pulsating discharge across the gap therebetween, means creating a reference voltage, means to compare the reference voltage with the average value of the voltage across the gap to produce an actuating voltage having an amplitude and polarity proportional to the algebraic difference between said compared voltages, and circuit means connecting said actuating voltage for shifting said valve to said graduated positions in accordance with the amplitude and polarity of said actuating voltage.

3. In an electric discharge machine having a tool electrode and a work electrode supported for relative movement, the combination of a reversible hydraulic motor for effecting said movement in either of two directions, a control valve therefor having a neutral position, opposed resilient means for holding said valve in its neutral position, electro-magnetic means for shifting said valve to graduated positions on either side of its neutral position, a source of electrical power connected to said electrodes to create a voltage across the gap between said electrodes which will ionize the gap at a predetermined spacing and produce pulsating electric discharges across the gap between said electrodes, a shunt circuit connected across the gap in which the average voltage of said discharge will appear, means creating a reference voltage, means to compare said average voltage of said discharges appearing in said shunt circuit with said reference voltage to produce an actuating voltage having a polarity and magnitude corresponding to the algebraic difference between said compared voltages, and means connecting said actuating voltage to said electro-magnetic means to shift said valve and control the direction and rate of operation of said motor in accordance with the polarity and magnitude of said actuating voltage.

4. In an electric discharge machine having a tool electrode, a work electrode, and a source of electrical energy for applying a voltage between said electrodes, the invention comprising a power operable means for traversing one electrode toward the other through a non-working range to a working range, a shunt circuit connected across the gap between said electrodes for yielding an output voltage proportional to said applied voltage, said shunt circuit including a variable resistance element adapted to adjust the factor of proportionality as its resistance is varied, a circuit supplying a reference voltage, means to determine the difference between said output voltage and said reference voltage, means for controlling said power operable traversing means in response to the difference between said reference voltage and said applied voltage to cause traversing of said one electrode, means to adjust said reference voltage from a value equal to said output voltage to a value less than said output voltage to move the electrode through the non-working range to the working range, and means operable by said power operable traversing means for progressively adjusting said resistance element as the electrode is moved through the non-working range to automatically maintain the output voltage equal to the reference voltage for any selected value of reference voltage in the non-working range and thereby prevent drifting of the electrode from a position corresponding to the selected value of the reference voltage.

5. In an electric discharge machine for removing material from an electrically conductive work piece, the combination of a work support for holding the work piece, an electrode tool supported for movement toward and away from the work piece to change the gap between them, a source of electric power connected between said tool and said work piece to create a voltage across said gap which will ionize the gap at a predetermined spacing and produce pulsating electric discharges across the gap, a circuit connected across the gap for providing a measure of the average voltage across the gap, a source of reference voltage, means for comparing the average voltage across the gap with said reference voltage and producing an error voltage which is a measure of the algebraic difference between the two voltages, a reversible hydraulic motor operatively connected with said tool for moving said tool toward or away from said work piece, a fluid pressure medium, a reversible servo-valve having a piston for controlling the flow of said medium to and from said motor, means for biasing said piston toward a neutral position, and a motor coil carried by said piston for moving the same away from its neutral position in a direction and to an extent corresponding to the polarity and magnitude of said error voltage to thereby control the direction and rate of operation of said motor and tool in accordance with the polarity and magnitude of said error voltage.

References Cited in the file of this patent

UNITED STATES PATENTS

| | | |
|---|---|---|
| 1,418,707 | Hansen | June 6, 1922 |
| 2,084,168 | Thiemer | June 15, 1937 |
| 2,145,010 | Kennedy et al. | Jan. 24, 1939 |
| 2,201,483 | Eklund | May 21, 1940 |
| 2,278,480 | Payne | Apr. 7, 1942 |
| 2,296,734 | Payne | Sept. 22, 1942 |
| 2,389,164 | Payne | Nov. 20, 1945 |
| 2,773,168 | Williams | Dec. 4, 1956 |

FOREIGN PATENTS

| | | |
|---|---|---|
| 637,793 | Great Britain | May 24, 1950 |
| 1,062,480 | France | Dec. 9, 1953 |